July 27, 1965    J. H. McMEEKIN    3,196,550
DIFFERENTIAL TRANSFORMER APPARATUS FOR
INSPECTING GLASS CONTAINER FINISHES
Filed Feb. 18, 1963    3 Sheets-Sheet 2
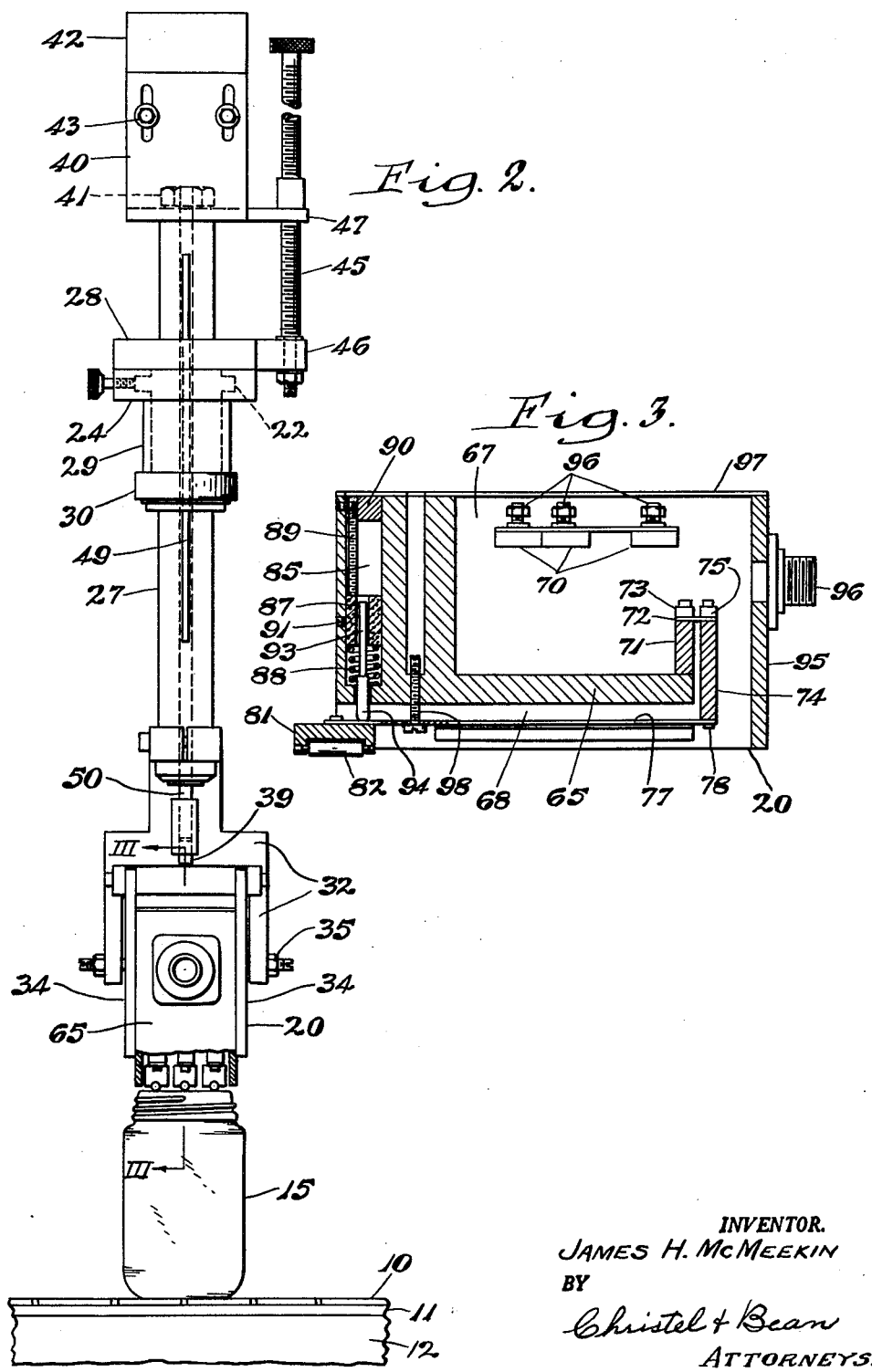
INVENTOR.
JAMES H. McMEEKIN
BY
Christel & Bean
ATTORNEYS.

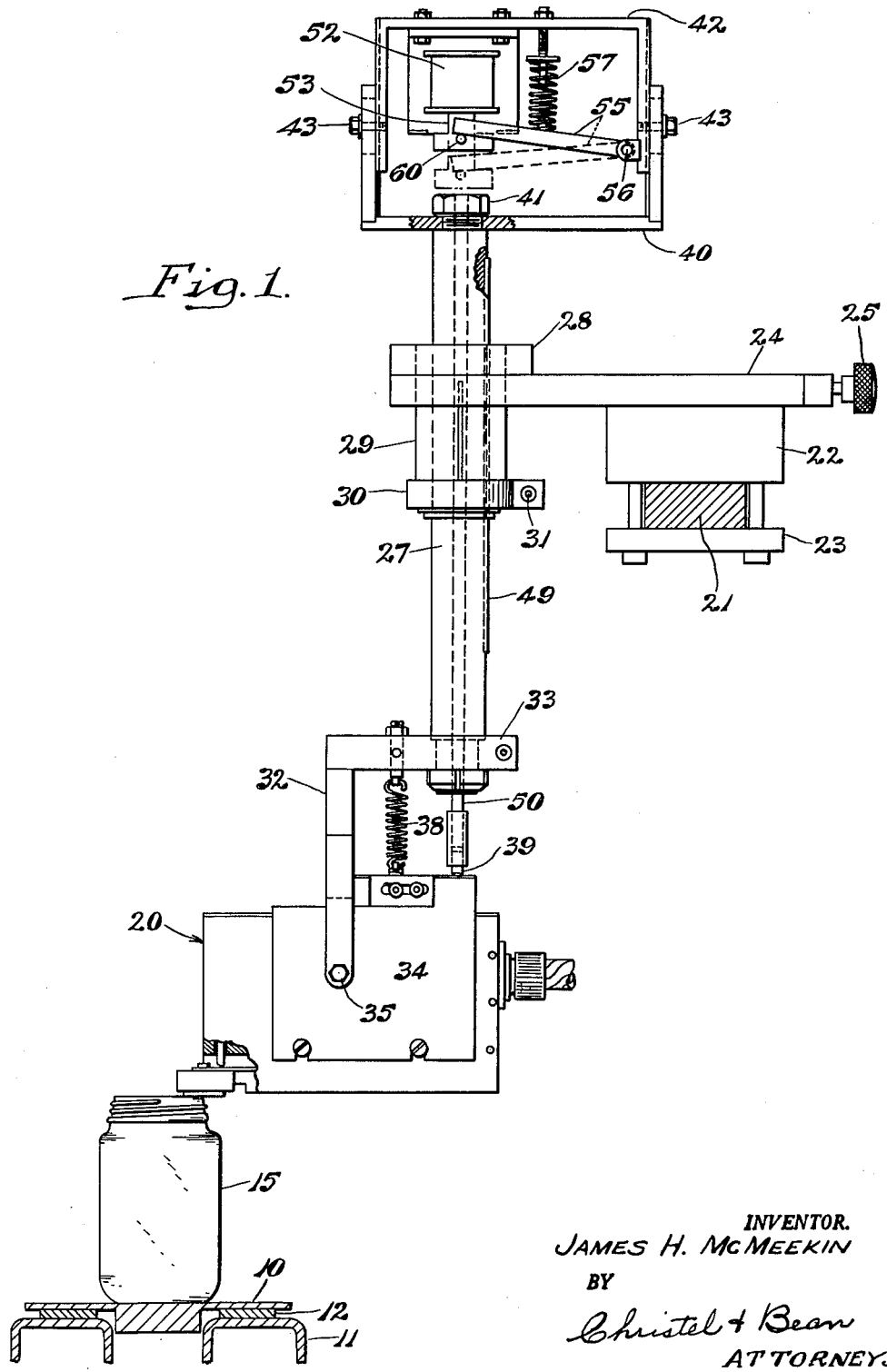

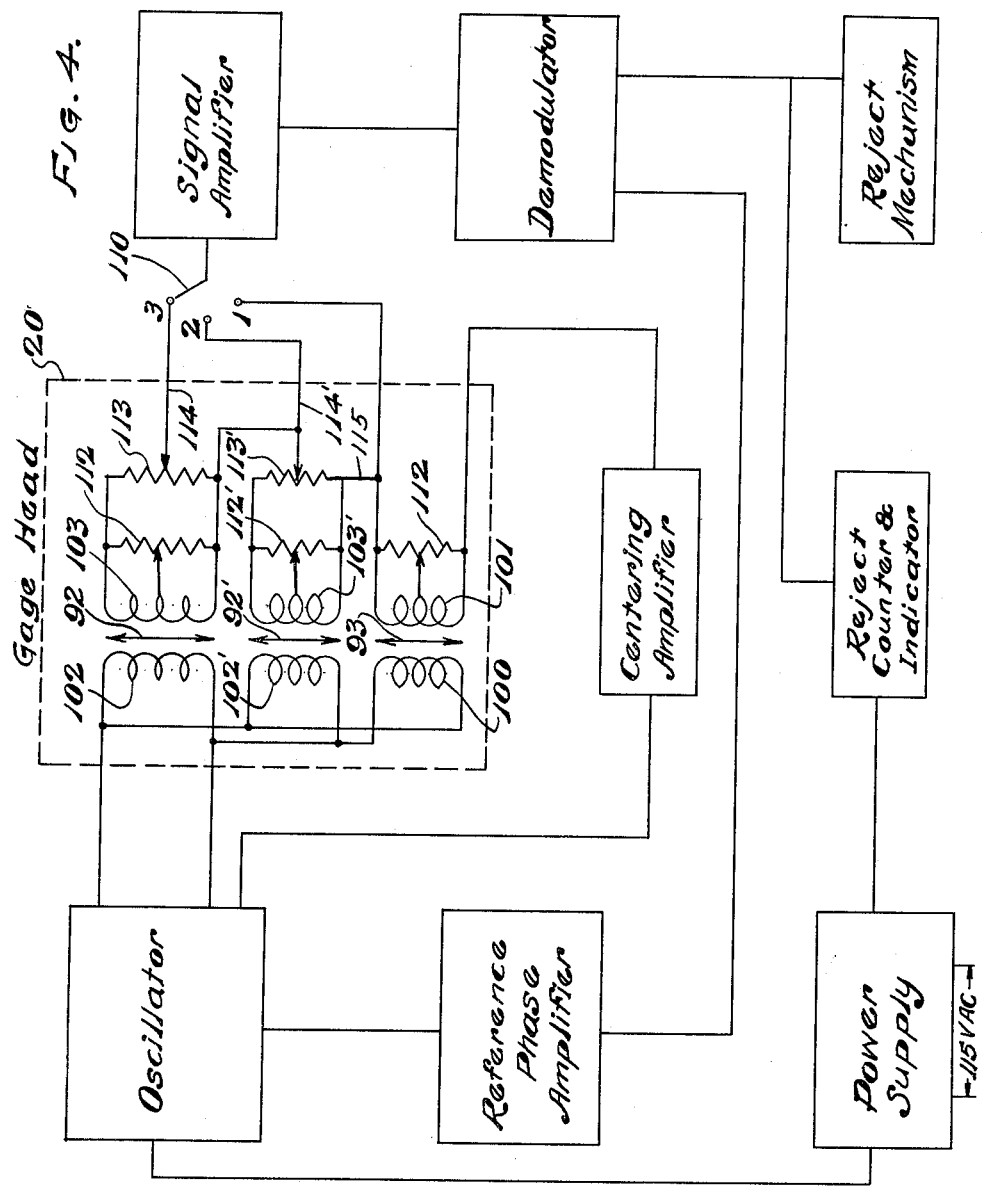

United States Patent Office

3,196,550
Patented July 27, 1965

3,196,550
DIFFERENTIAL TRANSFORMER APPARATUS FOR INSPECTING GLASS CONTAINER FINISHES
James H. McMeekin, Brockway, Pa., assignor to Brockway Glass Company, Inc., Brockway, Pa.
Filed Feb. 18, 1963, Ser. No. 259,304
5 Claims. (Cl. 33—174)

This invention relates to inspection apparatus and particularly to novel differential transformer means for sensing surface deviations. More particularly, the apparatus relates to means for detecting such deviations by tactile sensing along a surface normally defining a straight line or a given arc of curvature.

While the principles of the present invention are of general application in thus detecting and sensing surface deviations, such principles may be aptly illustrated by reference to the inspection of surfaces of glass containers which generally comprise surfaces of revolution or, at least, commonly have mouth or finish portions comprising surfaces of revolution even in the case of containers having non-circular body portions.

Fundamentally, the present invention comprises the employment of three spaced contact members each arranged to control a movable element, as for instance the armature of a differential transformer. As will be more fully described later herein, the three transformers are electrically balanced so that they have a zero output when the three contact members are in a predetermined alignment, as for instance, in a straight line or lying along an arc of predetermined radius. Further, electrical means are provided for producing a sensible electrical signal or controlling impulse when one or more contact members move relative to the other so that they deviate from the predetermined plane or arc of curvature.

The differential transformer arrangement of the present invention provides transducer means which may readily be adjusted to produce zero output when the several sensing devices are in a straight line or lie precisely along a predetermined arc, as the case may be. The arrangement is extremely sensitive and detects very slight deviations from the predetermined line or arc. The electrical portion of the apparatus may readily be adjusted to exert a controlling impulse whenever the deviation sensed thereby is of a given degree, whereby in inspection of glass containers for instance the degree of tolerance may be selected and varied at will.

In the case where a surface being inspected lies in a plane, for instance, the plane under inspection need not be a fixed plane with respect to the apparatus. For instance, if the upper end of a glass jar lies entirely in a single plane but the plane is slightly inclined due to variations in the conveying, supporting or jar-rotating mechanism, no false signal of deviation will result. Various electrical controls are provided whereby, for instance, only one or two of the contact members and their associated differential transformers are operative. Thus a variety of inspection operations may be performed in addition to the basic ones described above in general terms.

Speaking generally, the specific apparatus illustrated in the drawings and described in the following specification by way of illustrating the principles of the present invention is employed in inspecting the finish portions of glass containers, that is, the top surfaces of the mouth portions of such containers. A common defect known as "down finish" occurs when the gob of molten glass is insufficient, when blown, to completely fill the blow mold. This generally results in a concavity or curving depression in the top surface of the container mouth.

The apparatus of the present invention is especially useful in detecting "down finishes" and, in the same way and in the same inspection operation, finishes which are defective by reason of the fact that they project upwardly at some portions. Any deviation from a flat plane will be sensed and the impulse thus developed is amplified and caused to effect further automatic operations, such as automatic rejection of containers having imperfect finish portions. In this connection, the apparatus is such that if a container does not stand evenly or if the supporting surface is not truly horizontal, no false indication of a defective top finish will be given since such irregularities will not cause the three sensing elements to deviate from a straight line, even though the straight line which they define may vary in angular disposition with respect to the horizontal.

The same general principles may be employed in inspecting the arcuate side wall surfaces of containers having cylindrical body portions or body portions having circular portions, in order to detect flat portions or other irregularities and may also be used to gage or measure outside diameters.

A typical embodiment of the principles of the present invention is illustrated in the accompanying drawings and described in detail in the following specification but it is to be understood that such embodiment is merely by way of illustrating the principles of the present invention and that the spirit and scope of the invention is not limited to such embodiment nor otherwise than as defined in the appended claims.

The novel portion of the inspection apparatus of the present invention resides in the particular tactile sensing arrangement and the manner in which conditions sensed thereby are transmuted into electrical signals or impulses and the manner in which such electrical signals or impulses are employed in controlling machine operation or in giving indications of physical variations in the articles being inspected.

The apparatus of the present invention employed in conjunction with such physical sensing and transducer means includes automatic means for locating articles to be inspected, for successively rotating such articles at an inspection point, for introducing contacting means into proper position for tactile engagement with predetermined portions of a rotating article, and for controlling subsequent movements of such articles in accordance with the conditions exhibited by a surface traversed by the sensing means.

The portion of the apparatus for locating and rotating the articles and for controlling subsequent movements of the articles may be substantially the same as shown and described in United States Patent No. 3,071,247, issued January 1, 1963, in the names of Miller Paruolo and George G. Miles. Accordingly, portions of the present apparatus which substantially duplicate the above portions of the patent just identified are not illustrated in the accompanying drawings nor described in detail in the following specification, the general disclosure of such prior patent being incorporated herein by reference.

The inspection apparatus of the present invention which detects defects or variations by tactile sensing may be employed simultaneously and in conjunction with photoelectric defect detection means. Such latter means is particularly sensitive to the presence of defects which produce substantial variations in light refraction and reflection, such as cracks or checks. A given container oriented at a given inspection point may be rotated to cause the sensing means of the present invention to traverse a given orbit about the container, and at the same time optical scanning means may traverse the same or other orbits about the container, and both of these inspection methods and devices may act upon a single container-rejecting mechanism so that a defect sensed through either the tactile means of the present invention or the optical means which may be used in conjunction therewith will energize the same article rejection apparatus.

An automatic optical inspection means of the kind referred to here is illustrated and described in detail in United States patent to George G. Miles and John Mc-Mackin, No. 2,902,151, dated September 1, 1959. This patent illustrates and describes in detail mechanism for orienting containers or like articles along a conveyor belt, for passing them one by one to an inspection zone, for triggering a container arresting and rotating means as a container moves into the inspection zone, and for operating a container-rejection means when a detectable light variation produces the necessary electrical impulse upon the presence of a defect.

Accordingly, the means which releases containers one by one to the inspection means, the means for triggering and timing the inspection cycle, and the rejection means will be described herein only in a general way, it being understood that the details of the mechanisms for these purposes may be the same as in either of the above-mentioned patents and that accordingly the release means, the triggering and timing means and the rejection means of the foregoing patents may be considered to be incorporated herein by reference.

A single specific embodiment of the principles of the present invention is illustrated in the accompanying drawings and described in detail in the following specification. However, it is to be understood that such embodiment is set forth by way of example only and that numerous mechanical and electrical variations may be made therein without departing from the principles of the invention, the scope of which is limited only as defined in the appended claims.

In the drawings:

FIG. 1 is a general elevational view of one form of the apparatus of the present invention viewed along the line of travel of the conveyor which conventionally carries containers to and from the apparatus of the present invention;

FIG. 2 is an elevational view taken generally at right angles to FIG. 1;

FIG. 3 is a cross-sectional view taken generally on the line III—III of FIG. 2 but on an enlarged scale; and FIG. 4 is a combination wiring diagram and block diagram of the electrical portion of the apparatus.

Like characters of reference denote like parts throughout the several figures of the drawings and reference will first be had to the general organization of the apparatus whereby glass containers are successively brought to the inspection unit of the present invention where they are rotated in conjunction with the inspection operation and the means for supporting the inspection unit and presenting the same in an inspecting position.

Referring to FIG. 1, the numeral 10 designates a conveyor element of the type known as a table top chain which moves along a conveyor frame 11, conventional wear strips being designated 12. FIG. 1 views the apparatus in the direction of movement of the conveyor element 10 and the numeral 15 designates a glass jar positioned on conveyor 10 at the inspecting station of the present invention.

It is to be understood that means engage each container 15 at the inspecting station to rotate the same on its own vertical axis and such rotating means may be the same as is fully illustrated and described in Paruolo et al. Patent No. 3,071,247 mentioned earlier herein.

The inspection unit per se is generally designated 20 in FIG. 1 and the means for supporting and positioning the same will now be described. In FIG. 1 the numeral 21 designates a supporting beam which extends generally parallel to conveyor 10 and may be supported above and adjacent thereto in any desired manner again, for instance, as shown in Paruolo et al. Patent 3,071,247.

A block member 22 is clamped to beam 21 as at 23 and a rectangular frame member 24 is disposed about block 22 and is slidably guided thereby for movement from left to right as viewed in FIG. 1. An adjusting screw 25 carried by frame 24 has threaded engagement with block 22.

The left-handed portion of frame member 24 as viewed in FIG. 1 is positioned on a hollow shaft 27 for vertical sliding movement relative thereto. The adjusting screw 25 is employed to adjust the vertical axis of shaft 27 from left to right as viewed in FIG. 1 by movement of frame 24 relative to block 22, particularly to position the inspection unit 20 for operation on containers of various diameters.

Frame member 24 is fastened to a collar 28 of a split bushing 29 which is clamped to shaft 27 by a clamp collar 30, whereby the assembly comprising frame member 24 and bushing 29 may be adjusted vertically along shaft 27 by releasing a clamp screw 31, thus positioning the shaft 27 at any desired elevation with respect to the supporting frame 24.

A forked bracket 32 is clamped to the lower end of shaft 27 as at 33 and gives pivotal support to side plates 34 of the inspection unit 20 as at 35 whereby the inspection unit is pivotally mounted on a horizontal axis. The inspection unit 20 is resiliently urged in a counterclockwise direction as viewed in FIG. 1 by an extension coil spring 38 and may be selectively pivoted in a clockwise direction by operation of an abutment pin 39 in a manner and for purposes which will presently appear.

Referring now to the upper portion of FIG. 1, a U-shaped bracket 40 is fixed to a reduced upper end portion of shaft 27 by a nut 41 and an inverted U-shaped bracket 42 is attached to the legs of U-shaped bracket 40 to form a generally rectangular frame. The brackets 40 and 42 are adjustably connected as at 43 for varying the height of the rectangular frame which they form.

As shown in FIG. 2, a height adjustment screw 45 is journaled at its lower end in an extension 46 of collar 28 of the split bushing 29 so that screw 45 is free to rotate relative to extension 46 but is held against relative axial movement. Screw 28 threads through a lateral extension 47 of U-shaped bracket 40 so that the vertical disposition of the frame formed by U-shaped brackets 40 and 42 may be precisely adjusted and the height of shaft 27 is thus determined by the adjustment of screw 45.

Thus the clamp 30 and split bushing 29 are loosened to permit vertical adjustment of shaft 27 by screw 45 and are then tightened to maintain adjustment. Bushing 29 and shaft 27 have a key connection 49 to prevent relative rotation thereof and the clamp collar 30 merely holds the parts in their proper position of vertical adjustment once such position is determined by the setting of screw 45.

Once the mechanism is set up for inspection of a container of a given size and shape the supporting shaft 27 remains fixed and stationary relative to support 21 and the conveyor 10.

Abutment pin 39 is fixed to the lower end of a shaft 50 which extends through hollow shaft 27. An electromagnet 52 is fixed to the under side of bracket 42 and includes an armature member 53. An arm 55 pivoted to bracket 42 as at 56 is normally urged downwardly by a compression coil spring 57 and bears downwardly against a pin 60 carried by armature 53.

Thus when electromagnet 52 is not energized, its armature is held downwardly in the dot and dash line position shown in FIG. 1 by arm 55 and spring 57. Armature 53 thus urges shaft 50 downwardly and through abutment pin 39 holds the inspection unit 20 in a clockwise limit position against the urge of spring 38. This is the inactive or withdrawn position of the inspection or gage unit.

When an inspection operation is to be performed electromagnet 52 is energized, retracting armature 53 against the resistance of spring 57 and extension coil spring 38 pivots the inspection unit 20 to the counterclockwise operative position illustrated in FIG. 1.

Reference will now be had to the inspection unit 20 per se and in this connection reference will be had particularly to FIG. 3. The body member of the inspection unit comprises a block 65 which is detachably secured between the side plates 34. Block 65 is hollowed out as at 67 and 68 to form recesses for receiving a group of balancing and calibration potentiometers 70 and the supporting structure for the contact members of the inspection unit, respectively.

A transverse support bar 71 is fixed to block 65 and attached to its upper end are a series of three side-by-side flat spring members 72 which are held in place by a clamp bar 73. Fixed to projecting portions of each of the three spring plates 72 are depending arm members 74 which are clamped to such projecting spring plate portions by retaining blocks 75.

A longitudinal strip or plate member 77 is fixed at one end to each of the depending arms 74 as at 78 and at its other end each strip or plate member 74 has attached thereto a bearing member or roller holding device 81 which gives rotatable support to a freely rotatable article contacting roller 82. The plate members 77 are relatively stiff so that the rollers 82 are normally free to move upwardly and downwardly only by flexure of the spring plate 72 associated with each roller support as just described.

Adjacent to the left hand side of block 65 as viewed in FIG. 3, are a series of three bores 85 in vertical alignment with the three roller holders 81 and a transformer core 87 is contained in each bore 85, each of the transformer cores 87 being separately vertically adjustable in its bore 85.

As shown in FIG. 3, a compression coil spring 88 beneath each transformer core 87 tends to urge the same upwardly and an adjusting screw 89 which threads into a block 90 bears against the upper portion of each transformer core to adjust the same downwardly against the resistance of spring 88. A set screw 91 threading into block 65 is brought to bear against each transformer core 87 to lock the same in adjusted position.

Each transformer core 87 contains a vertically movable armature which connects with an armature support pin 94, the latter resting at its lower end on the plate member 77 of the associated roller holder 81. The armature of the middle transformer core 87 is designated 92 and the armatures of the end transformer cores 87 are designated 93 and 93'. From the foregoing it will be noted that up and down movements of any of the three rollers 82 as in passing a surface irregularity produce corresponding axial movements of the associated armature 92, 93 or 93' thereof, as the case may be, in its transformer core 87.

The manner in which such movements are electrically related as between the three contact rollers 82 and transformers 87 and the manner in which such movements are translated into useful control and indicating impulse will be described in greater detail in conjunction with the wiring diagram, FIG. 4.

Block 65 is provided with a rear cover plate 95 and a cable connection device 96 for readily connecting the several potentiometers 70 to the external circuitry and a removable top cover plate 97 is likewise provided. Adjustment screws 96 are provided for the balancing and calibration potentiometers 70. A screw 98 passes freely upwardly through each plate 77 and threads into block 65 whereby the position of vertical adjustment of each screw limits downward movement of the respective roller 82 by engagement of plate 77 against the head of the associated screw 98.

Referring now to the wiring diagram, FIG. 4, the inspection or gage head unit 20 is shown schematically. In FIG. 4 the primary and secondary windings of the three transformer cores 87 described previously herein are designated as follows. The middle transformer core 87 of the gage head, as viewed in FIG. 2, is shown at the lower part of the gage head diagram in FIG. 4, the primary and secondary windings thereof being designated 100 and 101. The primary and secondary windings of the two end transformer cores 87 of FIG. 2 are shown at 102 and 103 and at 102' and 103', respectively, in FIG. 4. The armature of the middle transformer is designated 93 in FIG. 4 and the armatures of the end transformers are designated 92 and 92'.

It will be noted that the primary winding 100 of the middle transformer core 87 is of opposite polarity from the corresponding primary windings 102 and 102' of the two end transformers cores 87, the windings being otherwise of equal inductive values. The secondary windings 101, 103 and 103' are likewise of equal inductive values.

In the normal three transformer operation of the present invention a three-position selector switch 110 is in the position illustrated at the right of gage head 20 in FIG. 4 connecting with contact No. 3. The secondary winding 101 has an output resistance 111 and the secondary windings 103 and 103' have output resistances designated 113 and 113', respectively. With the switch on contact No. 3, as shown in FIG. 4, a conductor 114 from contact No. 3 constitutes a midpoint tap of output resistance 113 and it will be noted that a series circuit is provided, including midpoint tap 114, the lower half of output resistance 113, a midpoint tap 114' which leads to output resistance 113', the lower half of output resistance 113', conductor 115, and the full length of output resistance 111.

Accordingly, if the system is in balance, the algebraic sum of the voltages thus placed in series will be zero, having in mind that the polarity of output resistance 111 is opposite to that of the resistances 113 and 113' and only half of each of the two latter resistances are included in this series circuit. Thus when the components are properly adjusted and calibrated and when the several armatures 92, 92" and 93 occupy like positions, the net output at switch 110 is zero.

From the foregoing it will be noted that movement of the armatures 92 and 92' of the end transformers (as viewed in FIG 2) in opposite directions equal amounts will still give a zero output reading, since the sum of the midpoint tap outputs of the secondary windings 103 and 103' will still be equal and opposite to the full output of secondary winding 101. Thus if a straight line or a predetermined arc along which the rollers 82 are travelling tilts with respect to gage head 20, but still remains a straight line or an arc of predetermined radius, as the case may be, it will not disturb the normal zero output of the gage head.

Similarly, if the rollers 82 should all be lifted or lowered equal amounts, so that the three armatures 92, 92' and 93 move equal distances in the same direction, the net output of the gage head 20 will still be zero and no indication of abnormality will result, since the surface being gaged is still a straight line or an arc of predetermined radius, as the case may be. Also, if a combination of the two foregoing movements takes place, that is if the straight line surface or arc both tilts and raises or lowers bodily, but without deviation from the straight line or arc, there will likewise be no variation from the normal zero output of the three transformers.

However, if the rollers 82 and the connected armatures 92, 92′ and 93 are subject to deviations as in the case of a deviation from linearity or a deviation of the rate of curvature of the surface being gaged, the output of the gage head 20 at 110 will vary from zero proportionately to such deviation. The output signal appropriately amplified and demodulated is caused to actuate a reject mechanism which may be the same in mechanical construction and operation as the reject mechanism of the above identified Paruolo et al. Patent No. 3,071,247.

It will be noted from FIG. 4 that the secondary winding 103 and 103′ are provided with balancing potentiometers designated 112 and 112′. In the case of the middle transformer 100, 101, the output resistance 111 serves as a balancing potentiometer. Apart from the gage head 20 FIG. 4 comprises mainly a block diagram since the manner in which the three differential transformers are energized and the manner in which output signals therefrom are amplified and employed will be clear to those skilled in the electrical and electronic arts without detailed delineation.

When the gage selector switch 110 is in the No. 1 position the middle transformer of unit 20 (the lowermost transformer 100, 101 in the wiring diagram) is the only transformer connected in the output circuit and may be employed as a straight displacement type transformer for use as a height gage or the like. The gage selector switch further permits calibration of the differential transformers.

With the switch 110 in position No. 1, the lower transformer 100,101 in the wiring diagram (the middle transformer of the gage unit) is adjusted and set to a predetermined value by means of the balancing potentiometer 111 and by physical adjustment of the relative position of armature 93. The switch 110 is then moved to position No. 2 and the center transformer of the wiring diagram is similarly calibrated by adjustment of potentiometer 112′ and adjustment of the position of armature 92′, and in position No. 3 the top transformer of the wiring diagram will be calibrated in a similar manner.

I claim:

1. Means for sensing irregularities in plane or arcuate surfaces comprising three equally spaced contact members aligned in a common plane, means supporting said members for independent movement in said plane, a series of three transformers in axial registry with said contact members, armature means movable axially in each of said transformers to vary the inductive output thereof, the two end transformers having equal output potentials at corresponding normal armature positions and the intervening transformer having an output potential equal to the sum of the other two at a corresponding normal armature position but of opposite polarity, whereby the normal net output of the three transformers is zero, each of said armature means being connected for movement with one of said contact members for axial movement in its associated transformer upon movement of said contact member in a direction generally normal to the surface being sensed to vary the output potential of its associated transformer proportionate to the degree of movement of such contact member, and means connected to receive the net output of said transformers and adapted to produce a control impulse upon predetermined deviations in such net output from zero.

2. Means for sensing irregularities in plane or arcuate surfaces comprising three equally spaced contact members aligned in a common plane, means supporting said members for independent movement in said plane, a series of three transformers in axial registry with said contact members, armature means movable axially in each of said transformers to vary the inductive output thereof, the two end transformers having output potentials of like polarity and the intervening transformer having an output potential of opposite polarity, said output potentials being connected in series whereby their algebraic sum with the armature means in normal position comprises an output signal of a predetermined value, each of said armature means being connected for movement with one of said contact members for axial movement in its associated transformer upon movement of said contact member in a direction normal to the surface being sensed to vary the output potential of its associated transformer proportionate to the degree of movement of such contact member.

3. Means for sensing irregularities in rotating surfaces of revolution comprising three equally spaced contact members normally aligned in a common plane, and adapted to track along such rotating surface successively, means supporting said members for independent movement in said plane, a series of three transformers in axial registry with said contact members, armature means movable axially in each of said transformers to vary the inductive output thereof, the two end transformers having equal output potentials at corresponding armature positions and the intervening transformer having an output potential equal to the sum of the other two at a similarly corresponding armature position but of opposite polarity, whereby the normal net output of the three transformers is zero, each of said armature means being connected for movement with one of said contact members for axial movement in its associated transformer upon movement of said contact member in a direction normal to the surface being sensed to vary the output potential of its associated transformer proportionate to the degree of movement of such contact member, and means connected to said transformers to receive the net output thereof and transmit a signal varying in accordance with variations in such net output.

4. Gage means for detecting variations in a surface comprising a holder having three equally spaced aligned contact members adapted to simultaneously engage a linear or arcuate surface to be gaged, said contact members being held in predetermined aligned relation by such surface when the surface is of correct conformation, a series of three aligned transformers carried by said holder, an armature movable axially in each transformer to vary the output thereof, the two end transformers being calibrated to have equal output potentials when the armature of each is in predetermined normal position, the middle transformer being calibrated to have an output potential equal to the algebraic sum of the potentials of the other two when its armature is in predetermined normal position but of opposite polarity, whereby the combined output of the three transformers is zero when all three armatures are in normal position, each armature being connected to one of said contact members for movement axially in its associated transformer by movement of said contact member to vary the output potential of its associated transformer proportionate to the degree of movement of such contact member.

5. Gage means for detecting variations in a surface comprising a holder having three equally spaced aligned contact members adapted to simultaneously engage a linear or arcuate surface to be gaged, said contact members being held in predetermined aligned relation by such surface when the surface is of correct conformation, a series of three aligned transformers carried by said holder, an armature movable axially in each transformer to vary the output thereof, the two end transformers being calibrated to have equal output potentials when the armature of each is in predetermined normal position, the middle transformer being calibrated to have an output potential equal to the algebraic sum of the potentials of the other two when its armature is in predetermined normal position but of opposite polarity, whereby the combined output of the three transformers is zero when all three armatures are in normal position, each armature being connected to one of said contact members for movement axially in its associated transformer by movement of said contact member to vary the output potential of its associated transformer proportionate to the degree of movement of such contact member, and means for independently adjusting said transformers axially with respect to said holder.

References Cited by the Examiner

UNITED STATES PATENTS

| | | | |
|---|---|---|---|
| 2,717,449 | 9/55 | Graham | 33—174 X |
| 3,080,659 | 3/63 | Wolford | 33—174 X |

FOREIGN PATENTS

| | | |
|---|---|---|
| 902,556 | 3/54 | Germany. |

ISAAC LISANN, *Primary Examiner.*

LEONARD FORMAN, *Examiner.*